Sept. 28, 1943.  F. M. ALLEN ET AL  2,330,197
FLEXIBLE PIPE JOINT
Filed Aug. 31, 1939  2 Sheets-Sheet 1

INVENTOR.
FRANK M. ALLEN
CLYBE B. TAYLOR
BY
ATTORNEY.

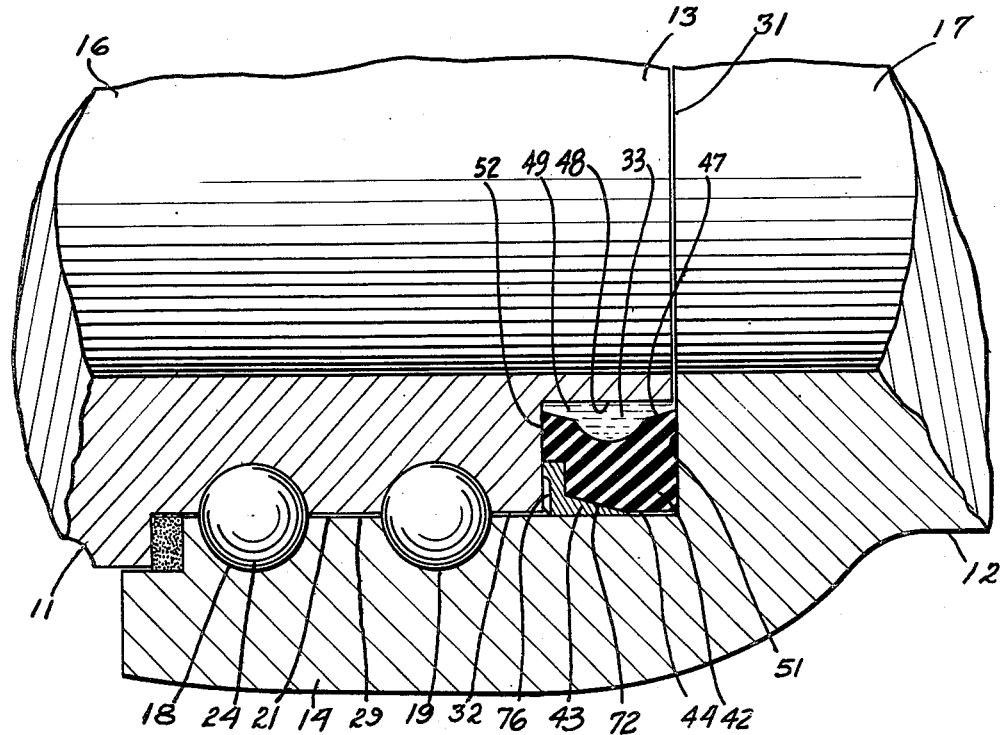

Patented Sept. 28, 1943

2,330,197

UNITED STATES PATENT OFFICE 2,330,197

FLEXIBLE PIPE JOINT

Frank M. Allen, near Azusa, and Clyde B. Taylor, Anaheim, Calif., assignors to The All-Flex Corporation, Los Angeles, Calif., a corporation of California Application August 31, 1939, Serial No. 292,860

11 Claims. (Cl. 285—97.3)

This invention relates to pipe joints or couplings, and has for an object the provision of an improved pipe joint of the swiveling type, i. e. a pipe joint adapted to interconnect two pipes or the like so as to permit uninterrupted flow from the bore of one pipe to the other, and to permit rotation about the axis of the pipes' bores of one of the pipes with respect to the other.

A further object of our invention is to provide an improved swivel, or "swing" joint of the character described, which includes as one of its constituent parts an improved packing member so designed and so associated with the pipe sections of the joint that it develops an unusually high degree of efficiency in preventing leakage of fluid through the interstice between the pipe sections, and yet is capable of prolonged use under the most severe circumstances.

A more detailed object in this connection is the provision of a packing member of the general type indicated, which is of a compound nature and develops a compound action, in that it comprises different but co-operating sealing elements, which one of the sealing elements operates to prevent escape of the fluid being determined by the extent of the hydrostatic pressure of the fluid contained within the pipe sections.

Another object of our invention is to provide an improved packing for a swing joint in the design of which especial provision is made to resist the tendency toward destruction of the packing by shearing of the sealing element.

Toward this same end, it is one of the objects of our invention to predetermine to which of the pipe sections will adhere, and to provide means which operate to diminish the tendency for the packing to adhere to the other of the pipe sections to an absolute minimum.

Another object in this connection is to construct both elements of the compound packing so that they both, separately, have the tendency to adhere to the same pipe section and to establish a sliding contact with the other of the pipe sections, and thus avoid subjecting the packing to the internal stresses in addition to those resulting from its resistance to the escape of fluid under pressure, which would arise if the different portions of the packing had the tendency to move with respect to each other.

A further object of our invention is the provision of a packing member of the character described, comprising a pair of co-operating elements, one of which is of deformable material and accordingly is adapted to be pressed into efficient, sealing engagement with the pipe sections by relatively low pressure of the fluid within the joint, and the other of which is of more rigid material and is interposed between the deformable member and the interstice between the pipe sections, with the result that it serves to prevent trusion of the deformable material from the packing recess and into the interstice when the packing is subjected to high pressures.

Another object in this connection is to provide a packing as described, wherein it is the backing member of relatively rigid material which also operates to perform the sealing function when high pressures are encountered, with the result that it not only serves as a backing for the deformable material, supporting it in such a manner that it assists the deformable material in resisting trusion into the interstice, but the backing member itself serves to seal the interstice when high pressures are encountered, thereby assuring that all surfaces of the deformable member are subjected to substantally the same pressure, and thus further minimizing the liability of destruction of the deformable member under high pressure operation.

A still further object of our invention is to provide a swivel pipe joint and a packing member therefor, of such a nature that it is capable of operating over a prolonged period of time and with a high degree of efficiency in performing the functions for which it was designed, and yet which is susceptible of inexpensve and rapid production in large quantities.

The invention possesses other objects and features of advantage, some of which, with the foregoing, will be set forth in the following description of the preferred embodiments of our invention which are illustrated in the drawings accompanying and forming a part of the specification. It is to be understood that we do not limit ourselves to the showing made by the said drawings and description, as we may adopt variations of the preferred forms without departing from the scope of the present invention as set forth in the claims.

Referring to the drawings:

Figure 2 is an enlarged view in longitudinal, medial section, of the lower portion of the joint of Fig. 1. Portions of the figure are broken away to reduce its size.

Figure 1:
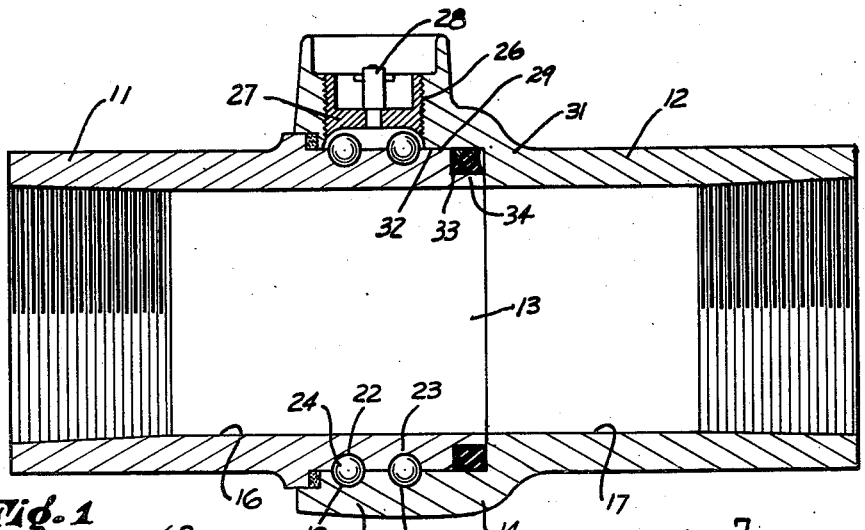
Figure 1 is a longitudinal, medial sectional view taken through a swivel pipe joint and packing therefor, embodying the principles of the present invention.

The flexible pipe joint of the present invention is designed to interconnect two portions of a conduit such as a pipe line in such a manner as constantly to maintain communication between the bores of the two portions and yet permit substantially unrestricted turning or twisting movement of one portion with respect to the other. That embodiment of our invention which has been chosen for illustration in the figures comprises co-operating male and female pipe sections 11 and 12, respectively, the end 13 of the male section 11 being revolubly disposed within a belled portion 14 of the female section 12, the two sections being in coaxial relation and having their bores 16 and 17, respectively in communication with each other. Preferably a pair of ball races 18 and 19 are formed in the bore 21 of the bell 14; and co-operating races 22 and 23, respectively, are provided in registry therewith in the outer circumferential wall of the end 13 of the male pipe section, to accommodate anti-friction balls 24. Inasmuch as these balls 24 fit within registering races or grooves, they serve not only to retain the two pipe sections 11 and 12 accurately in line and permit relative rotation therebetween with a minimum of friction, but they also retain the sections against axial movement with respect to each other, i. e., they serve to hold the sections together in operative relationship. They are inserted to their races after the two pipe sections have been placed in proper relative position, through an opening 26 in one side of the bell 14; and after insertion of the balls 24, a plug 27 is threaded into the opening to prevent escape of the balls. The plug 27 is provided with a fitting 28, preferably of conventional design, for use in supplying lubricant under pressure not only to the ball races, but also to the interstice 29 between the two pipe sections 11 and 12.

This interstice, in the present modification, comprises a radial portion 31 and a circumferential portion 32. We have found that a highly advantageous location for the annular recess 33 for the accommodation of the packing member 34 is at the intersection of these two portions 31 and 32 of the interstice. The recess preferably is formed as a relieved portion in the outer circumferential surface of the male pipe section 11 at the extreme inner end thereof, so that any fluid entering the recess from the bore of the conduit into which the joint is connected would have to enter by way of the radial portion 31 of the interstice; and from the recess the only means of egress is through the circumferential portion 32 of the interstice. It is for the purpose of preventing the escape of fluid under pressure through the interstice 29 between the sections 11 and 12 of the joint, that the packing member 34 is provided.

Figures 3, 4, 5, 6:
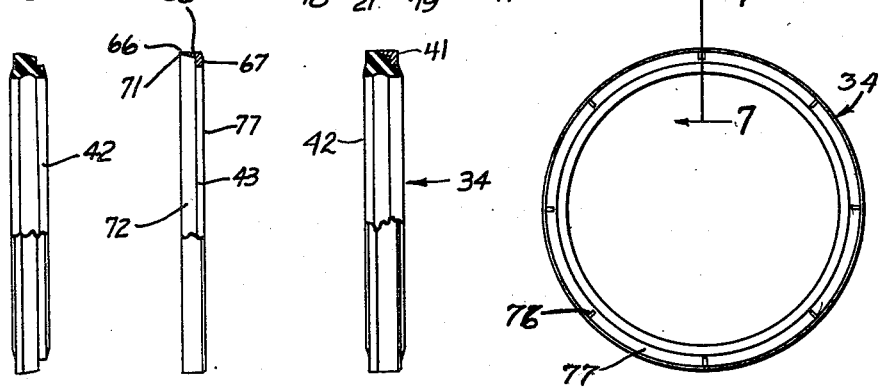
Figure 3 is a view in front elevation, of the packing member of Figures 1 and 2, removed from the pipe joint.
Figure 4 is a view partly in side elevation and partly in vertical section, of the packing member of Fig. 3.
Figure 5 is a view partly in side elevation and partly in vertical section, of the high pressure sealing element, or backing member of the packing member of Figures 3 and 4.
Figure 6 is a view similar to Fig. 5, but of the low pressure sealing element of the packing.

Referring first to that embodiment of packing member of our invention which is illustrated in Figures 1 to 7, inclusive, it will be observed that the device comprises two annular portions, e. g.: a low pressure sealing annulus 42, illustrated alone in Fig. 6, and a high pressure sealing annulus 43, illustrated alone in Fig. 5, adapted to be fitted together in coaxial, co-operative relationship as illustrated in Fig. 4.

The low pressure annulus 42 is fabricated of suitable relatively deformable material such as rubber, or, preferably, an especially prepared product known in the trade as "neoprene" because of its highly inert nature which adapts it for use in connection with the handling of fluids apt to have deleterious effects upon less resistant materials, and because of its great resistance to destruction by friction. In its maximum outside diameter, the deformable annulus substantially corresponds to the inside diameter of the wall section 44 of the female pipe section 12 which defines the outer circumferential wall of the annular recess 33, although if there be any difference between these two dimensions, it is preferred that the annulus be of slightly smaller diameter than the recess into which it is to be received, inasmuch as the inherent deformability of the material of which the member is formed permits it to be expanded by the pressure of the fluid it serves to retain within the conduit. Hence, a sufficiently tight contact between the outer circumferential surface 46 of the deformable member 42 and the outer circumferential wall 44 of the recess 33 obtains when the packing member is subjected to fluid pressure from within the conduit of which the swing joint is a part; and when the pressure is relieved, the packing member has the tendency to return to its initial outside diameter, releasing the pressure of the deformable annulus against the outer circumferential wall of the recess, and thereby tending to prolong the useful life of the packing.

The thickness of the deformable annulus 42, measured in a radial direction, is preferably somewhat less than the corresponding dimension of the recess 33, with the result that the inside diameter of the packing is slightly greater than the inside diameter of the recess. This causes the inner circumferential wall 47 of the annulus to be spaced from the inner circumferential wall 48 of the recess, with the result that the radial portion 31 of the interstice 29 leads into the annular space 49 therebetween. Accordingly, the inner circumferential wall 47 is subjected to the full pressure of the fluid within the conduit, which is of importance because reliance is placed upon the pressure of the fluid to increase the intimacy of engagement between the deformable member and the outer wall and the two side walls of the recess. Toward this same end, the inner circumferential wall 47 is formed materially concave, as clearly shown in Figs. 2 and 7, with the result that the force exerted by the fluid against the packing is not only radially outwards, but also laterally of the packing, i. e., toward the two side walls 51 and 52 of the recess. It is apparent, therefore, that the pressure of the packing member 34 against the outer and the two side walls of the recess is proportional with the pressure of the fluid within the conduit, and that the greater the pressure of the fluid, the more tightly does the packing member 34 seal the interstice 29 against the escape of fluid therethrough.

In order to enhance the tendency for the side walls of the packing member 34 to press against the side walls 51 and 52 of the recess, we prefer that the side walls 53 and 54 of the deformable annulus flare slightly when the member is relieved of all pressure, making the deformable member slightly thicker measured parallel to the axis of the annulus and near the inner circumferential wall 47. The side walls 51 and 52 of the recess 33, on the contrary, are substantially parallel, and the recess 33 corresponds in width to the narrower portion of the packing, with the result that when the packing is confined within the recess 33, its shape is changed from that illustrated in Fig. 7 to one in which its side walls 53 and 54 also are substantially parallel, with a consequent increase in the pressure of the inner corners 56 and 57 of the deformable member against the side walls 51 and 52 of the recess.

The high pressure sealing annulus 43 is composed of material having a materially greater degree of stiffness than that of which the low pressure member 42 is composed; but even though it be relatively stiff, the efficiency of the packing as a whole is materially increased if the high pressure member is slightly yieldable, so as to enable it to be pressed into intimate, exactly fitting relation with the proximal walls of the recess when the packing 34 is subjected to high pressures. We have found that brass meets these requirements most advantageously, and that this material has the added advantage of being sufficiently resilient to return to its original shape and size after such high pressures have been relieved, which feature is of importance for the reason that it minimizes the tendency for the packing to remain stuck within the recess when the joint is torn down after having been in service for some time. The annulus 43 is preferably formed of two flanges 66 and 67, both of annular form. The flanges 66 is a circumferential flange, its outer surface 68 being as accurately cylindrical in form and corresponding in outside diameter to the diameter of the outer wall of the recess 33 into which it is designed to be received, as is commercially feasible. The flange 67 extends radially inwards from an edge of the circumferential flange 66, with the result that the two flanges 66 and 67 co-operate to define an annular member 43 which in cross section is substantially L-shaped. The two annuli are complementary to each other in that the deformable annulus is relieved about the outer surface 46 thereof to provide space for the reception of the circumferential flange 68 of the rigid annulus, and the side wall 54 of the deformable annulus is notched to receive the radial flange 67, with the result that the corresponding outer surfaces of the two annuli are substantially in line with each other, thereby permitting reception of the assembled packing member within the recess, all four defining walls of which are smooth. This statement should be qualified, however, to the extent that the outside diameter of the rigid annulus 43, is permissibly slightly larger than the deformable annulus 42, leaving a slight shoulder 69 at the juncture of the flange 68 with the outer surface 46 of the deformable member (see Fig. 7) when the packing member is relieved of pressure. This is for the reason that reliance is placed in the capability of the deformable member to enlarge slightly more than the rigid annulus when pressure is imposed thereupon from the inside.

Figure 7:
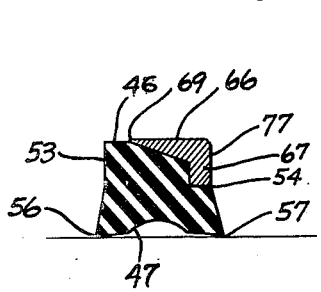
Figure 7 is an enlarged view in transverse section through the assembled packing member, showing the relative positions and the forms assumed by the high and low pressure sealing elements thereof before insertion of the packing into the pipe joint.

Whereas the radial flange 67 may conveniently be of rectangular cross sectional form, the circumferential flange 66 is preferably wedge-shaped, tapering to a relatively thin annular edge. This provides an inclined inner annular surface 72 for the circumferential flange 68 where it makes contact with the deformable annulus, as best shown in Figs. 2 and 7.

When assembling the joint, the packing member is placed within the recess in such position that the metal annulus is interposed between the deformable annulus and the circumferential portion 32 of the interstice 29. Hence, the metal ring 43 serves to prevent the deformable material of the other annulus 42 from being extruded from the recess 33 into the interstice when pressure is imposed upon the inner surface of the packing. If this pressure is relatively low, the effect upon the packing is to deform the yieldable annulus in such a manner that its outer circumferential surface 46 is pressed against the outer wall 44 of the recess 33, and the side walls 53 and 54 of the deformable member are urged laterally apart and against the side walls 51 and 52 of the recess, due to the fact that the fluid exerting the pressure is permitted to enter the concavity 47 in the inner circumferential wall of the packing. This pressure of the side walls of the deformable member against the side walls of the recess is most pronounced at the extreme edges, or corners 56 and 57, thus serving to prevent penetration of the fluid under pressure past these corners and between the deformable member and the side walls of the recess.

However, if the pressure of the fluid within the conduit becomes relatively great, the effect upon the packing is to press the metal annulus with great force against the proximal walls of the recess, closing the adjacent mouth of the interstice 29 the more tightly as the pressure increases. Consequently, when high pressures are encountered, it is the metal ring 43 which operates to prevent escape of fluid from between the pipe sections 11 and 12, the deformable member 42 serving to aid in pressing the metal ring 43 into sealing engagement, whereas when the packing is subjected to pressure in the lower ranges, all of the sealing is performed by the deformable member, and an important function of the metal annulus is that of a backing member for the relatively fluid deformable material of which the annulus 42 is composed, restraining it against detrusion from the recess 33 into the interstice 29.

The inclined inner surface 72 of the circumferential flange 68 co-operates in pressing the metal annulus 43 into sealing engagement with the walls of the recess when high pressures are encountered, inasmuch as any forces imparted to the flange 68 from the deformable member 42 must be in an oblique direction, due to the slope of the surface 72. Hence all outward pressure of the deformable member 42 against the flange 68 develops a component urging the metal annulus 43 laterally toward the outlet portion 32 of the interstice, crowding the metal annulus the more tightly into the associated corner of the recess, and thus contributing to the efficiency of the packing in preventing escape of fluid.

One of the more important features of the present invention resides in the relative proportions of the respective areas of contact of the two annuli 42 and 43 with the walls defining the recess 33, for it is through this means that it is predetermined with which of the two pipe sections 11 or 12 the packing will remain fixed while the other turns. The coefficient of friction of the deformable material of which the member 42 is formed is inherently materially greater than that of the metal of which the relatively rigid annulus 43 is formed, which is a matter of material importance in the present invention, for the reason that the radial flange 67 serves to keep as much of the deformable material as is consistent with efficient sealing, out of contact with the associated side wall 52 of the recess. Hence, one result of employing the flange 67 is to reduce the mean coefficient of friction of the assembled packing member 34 with the male pipe section 11, and thus permit the pipe section 11 to turn without carrying the packing with it. Toward this same end, only one wall of the recess presented by the pipe section 11 is contacted by the packing member 34, i. e., the side wall 52; whereas the entire extent of the outer circumferential wall 44 and almost the entire surface of the side wall 51 (both of these defining walls of the recess being presented by the other pipe section 12) are contacted by the assembled packing 34. It is apparent, therefore, that maximum area of the entire packing considered as a whole is established with the pipe section 12, and minimum area with the pipe section 11. It is also to be noted that the same conditions prevail from the standpoint of each of the two annuli 42 and 43 considered separately, i. e., each of these two members makes much greater contact with the pipe section 12 than it does with the pipe section 11. The importance of this lies in the fact that it aids in protecting the assembled packing from being torn apart as would be the case were the two annuli permitted to attach themselves separately to different ones of the pipe sections.

In order further to enhance the tendency for the packing to slide freely with respect to the pipe section 11 when relative motion between the two pipe sections occurs, a plurality of oil grooves 76 may be provided in the outer face 77 of the radial flange 67. These grooves 76 lead from the extreme corner of the metal ring 43 at the intersection of the face 77 with the outer face of the circumferential flange 68. Accordingly, they are in communication with the portion 32 of the interstice 29 which communicates with the ball races, thereby permitting lubricant to be forced into the grooves 76, whence it is enabled to spread to the side wall 52 of the recess, with respect to which the packing is intended to be free to move. The oil grooves 76 should not extend all the way across the face 77 of the flange 67, however, as the extreme edge of the flange must make intimate contact with the associated side wall 52 of the recess uninterruptedly throughout the entire circular length of that edge, inasmuch as it is important to reduce the effective width of the interstice existing between each of the flanges 67 and 68 to an absolute minimum, at least when the packing is subjected to high pressures, in order to prevent the relatively fluid material of the deformable annulus 42 from being forced thereinto.

Since no oil grooves are provided in the flange 68, there will be less tendency for lubricant to work itself between the flange 68 and the outer circumferential wall 44 of the recess, with respect to which the packing is intended to remain stationary.

The structural features of our improved packing are co-operative in their action in preventing leakage of even the most difficult fluids to control, such as compressed air and superheated steam, and under the most adverse operating conditions, such as under exceedingly high temperatures and pressures. Furthermore, they serve to present a packing of great durability, capable of operating with high efficiency over prolonged periods of time. One of the principal difficulties encountered when using more conventionally designed packings for high pressure service was their pronounced tendency to permit trusion of the deformable material of the packing out of the packing recess into the interstice between pipe sections leading from the opposite side of the recess from that at which fluid under pressure enters the recess. This difficulty of earlier packings has been substantially eliminated by the interposition of the relatively stiff, unyielding annulus 43 between the deformable member 42 and the interstice into which the pressure of the entrapped fluid would otherwise extrude the deformable material. Instead of being completely rigid and unyielding, however, the material of which the backing annulus 43 is formed is possessed of sufficient inherent yieldability for it to be pressed into very intimate contact with the proximal walls of the recess when subjected to pressure from within, thus reducing the width of the interstices between the walls of the recess and the flanges of the backing annulus to an exceedingly minute dimension, and this feature, coupled with the fact that the corners defining the distal edges of the outer faces 68 and 77 of the flanges 66 and 67, respectively, are formed so as to present sharp corners, serves to prevent all possibility of entrance of any of the material of the deformable member into the interstices between the backing member and the walls of the recess.

Another fault frequently encountered when subjecting more convenitionally designed packings to high pressures was the tendency for the deformable annulus to shear along a plane of cleavage extending from the mouth of the interstice where it leads from the packing recess, through the body of the deformable member obliquely to the opposite, inner surface thereof. This difficulty inherent in earlier packings has been substantially obviated in the present improved construction by the predetermination of with which of the pipe sections the packing will remain stationary, and by providing every facility for freedom of movement of the packing as a whole, and of each of its constituent annuli considered separately, with respect to the other of the pipe sections. Factors which contribute toward this end are maximum area of contact with one of the pipe sections and minimum with the other, and the provision of means for forcing lubricant between the packing and the portions contacted thereby of the pipe section with respect to which it is desired to have the packing free to move. So effective have these structural features of our improved packing demonstrated themselves to be, that the product of the area of contact of the deformable member 42 with the pipe section 11, multiplied by the coefficient of friction of these surfaces, is materially less than the product of the coefficient of shear of the deformable material multiplied by the area of the minimum plane of shear through the deformable annulus. Of course this desirable condition is enhanced if the contacting surfaces of the deformable member 42 and the pipe section 11 are lubricated; and due to the provision of the oil grooves 76 in the flange 68 which is immediately thereadjacent, such lubrication is assured.

It should be noted that although the flange 68 of the metal annulus 43 extends most of the distance across the outer face of the packing, it is materially shorter than the width of the recess 33. This leaves a material width of the deformable member between the edge of the metal flange 68 and the side wall 51 of the recess toward which the flange extends; and this detail is of importance for the reason that it imparts to the assembled packing an ample degree of variability in effective length to compensate for the variations in width of the recess which are occasioned by sudden fluctuations of pressure of the fluid within the conduit of which the pipe joint is a part. Whereas the extent of such variations in the width of the recess is quite small, it is frequently great enough to cause leakage around the packing unless the packing is capable of expanding so as to conform accurately to the increased size of the recess; and of course the packing must be capable of returning to its original size when the shock to which the conduit has been subjected has subsided and the sections of the pipe joint return to their original relative position, causing the recess to resume its original dimensions. It is readily apparent that if any portion of the metal annulus 43 corresponded in width to the recess, the packing would not possess this desirable ability to adapt itself to even slightly varying widths of the recess.

Figures 8, 9:
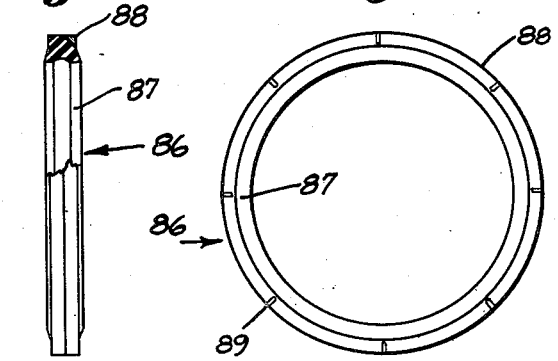
Figure 8 is a view similar to Fig. 3, but showing a slightly modified form of packing member.
Figure 9 is a view similar to Fig. 4, but of the packing member of Fig. 8.

Figures 8 and 9 illustrate a slightly modified form of packing member, indicated in its entirety at 86, which is somewhat simpler in design than that already described, and is accordingly less expensive to manufacture. However, it possesses some of the more important advantages and structural features in common therewith. This modified form of our improved packing member also is composed of two annuli, to wit: a low pressure annulus 87 of relatively deformable material, and a backing annulus 88 of relatively stiff, resilient material. Assembled, the packing member 86 conveniently may be of the same cross sectional configuration as the first described modification, so that it is receivable within a packing recess of the same shape and size. Each of the annuli 87 and 88, however, differs in cross sectional configuration from the corresponding annulus 42, 43, respectively, inasmuch as the resilient annulus 88 is, in cross section, triangular in form; and the deformable annulus is complementary therewith to present an assembled packing the cross sectional form of which meets the requirements of the particular recess within which it is designed to be received.

This modified form of packing 86 is intended to be installed within its recess in the same manner as the previously described modification, i. e.; with the metal annulus 88 interposed between the deformable annulus 87 and the portion of the interstice between pipe sections into which the deformable material would be apt to be extruded were the metal annulus not provided. Accordingly, in this instance also the metal annulus serves as a backing member for the deformable, and hence relatively fluid member. The deformable member 87 provides ample sealing facilities under low pressures; and when high pressures are encountered, the metal annulus 88 is pressed into sufficiently intimate contact with the walls of the recess to seal the interstice against escape of the fluid. The metal annulus also serves to reduce the areas of contact with the pipe section with respect to which the packing member is free to move, thus minimizing any tendency for the deformable member to shear, and this effect of the backing annulus is enhanced if oil grooves 89 are provided in that face of the annulus 88 which contacts the pipe section with respect to which the packing moves.

We claim:

1. In a flexible pipe joint for joining a pair of coaxially disposed pipe sections journalled for rotary motion and against axial movement with respect to each other and including intersecting wall sections extending in cooperative relation to each other to define an annular recess between said pipe sections, and packing means disposed within said recess, said packing means comprising an annulus of deformable material and an annular backer therefor of resilient material interposed between said deformable annulus and the interstice between said wall sections, said deformable annulus making contact with one of said pipe sections in an area of contact so small that the product of said area and the coefficient of friction between said deformable material and said pipe section is less than the product of the coefficient of resistance to shear of said deformable material and the area of the minimum annular plane of shear through said deformable annulus.

2. In a swing joint of the character described, a pair of pipe sections journalled for rotary motion and against axial movement with respect to each other and disposed with their bores in communication, said pipe sections having an annular recess therebetween encircling said bores, and packing means disposed within said recess and making greater frictional contact with one of said pipe sections than with the other to predetermine with which of said pipe sections said packing means will move when relative motion between said pipe sections occurs.

3. In a swing joint of the character described, a pair of pipe sections journaled for rotary movement and against axial movement with respect to each other and disposed with their bores in communication, said pipe sections having an annular recess therebetween encircling said bores, and a compound packing disposed within said recess and comprising an annulus of deformable material extending across the interstice between said pipe sections to prevent escape of fluid therethrough at low pressures, and a second annulus of metal also extending across said interstice and adapted to seal it against the escape of fluid or trusion of said deformable material therethrough at higher pressures.

4. In a swing joint of the character described, a pair of pipe sections disposed with their bores in communication and rotatable with respect to each other about the axis of said bores and restrained against relative axial movement, said sections having an interstice therebetween and at least one of said pipe sections having a relieved portion presenting an annular recess from which said interstice leads, and said interstice and annular recess being subject to variation in width as pressure within said bores fluctuates, and a packing disposed within said recess and comprising an annulus of deformable material extending across said recess to contact both of said pipe sections, and an annulus of resilient material interposed between said deformable annulus and said interstice and comprising a circumferential flange and a radial flange, said circumferential flange being shorter than the width of said recess whereby a material width of said deformable material is interposed between the end of said circumferential flange and the wall of said recess toward which said circumferential flange extends.

5. In a swing joint of the character described, a pair of pipe sections disposed with their bores in communication and rotatable with respect to each other about the axis of said bores and restrained against relative axial movement, said sections having an interstice therebetween and at least one of said pipe sections having a relieved portion presenting an annular recess from which said interstice leads, and a packing disposed within said recess and comprising an annulus of deformable material extending across said recess to contact both of said pipe sections, and an annulus of resilient material having a coefficient of friction smaller than that of said deformable material, said resilient annulus being interposed between said deformable annulus and said interstice, and means for predetermining with which of said pipe sections said packing will remain fixed when relative rotary motion occurs between said pipe sections comprising a flange on said resilient annulus extending between said deformable annulus and the pipe section with respect to which said packer is to move and thereby diminish the area of contact of said deformable material with the pipe element with respect to which said packing is to move.

6. In a swing joint of the character described, a pair of pipe sections disposed with their bores in communication and rotatable with respect to each other about the axis of said bores and restrained against axial movement, said sections having an interstice therebetween and at least one of said pipe sections having a relieved portion presenting an annular recess from which said interstice leads, and said interstice and annular recess being subject to variation in width as pressure within said bores fluctuates, and a packing disposed within said recess and comprising an annulus of deformable material extending across said recess to contact both of said pipe sections, and an annulus of resilient material interposed between said deformable annulus and said interstice and comprising a circumferential flange and a radial flange extending angularly from each other and from the line of entry of said interstice into said recess, at least one of said flanges being tapered to a thin outer edge whereby said tapered flange is adapted to be flexed under the impress of internal pressure to close any clearance between said tapered flange and the adjacent wall of said recess.

7. In a swing joint of the character described, a pair of pipe sections disposed in end-to-end abutment with their bores in communication, journal means interconnecting said pipe section for rotary motion with respect to each other, the interstice between said pipe sections being enlarged to present an annular recess encircling said bores whereby leakage between said pipe sections would pass through said recess and thence by the exterior portion of said interstice to the exterior of said pipe sections, and packing means disposed within said recess and comprising an annulus of deformable material and a metal backing ring interposed between said deformable annulus and said exterior portion of the interstice to restrain said deformable material against trusion into said interstice, said backing ring being of resilient material having sufficient resilience to cause it to return to its original form and position upon release of internal pressure thereagainst and thereby minimize the tendence for said backing to become bonded to either of said pipe sections.

8. In a swing joint of the character described, a pair of pipe sections disposed in end-to-end abutment with their bores in communication, journal means interconnecting said pipe sections for rotary motion with respect to each other, the interstice between said pipe sections being enlarged to present an annular recess encircling said bores whereby leakage between said pipe sections would pass through said recess and thence by the exterior portion of said interstice to the exterior of said pipe sections, and packing means disposed within said recess and comprising an annulus of deformable material and a metal backing ring interposed between said deformable annulus and said exterior portion of the interstice to restrain said deformable material against trusion into said interstice, the material of said backing ring being sufficiently yieldable to permit it to be flexed and pressed into intimate contact with walls of said recess on opposite sides of said interstice proportionally with the hydrostatic pressure imposed upon said packing means whereby said backing ring seals said interstice at high pressures and restrains said deformable material against trusion into the interstices between the backing ring and the walls of said recess and said deformable annulus serves as a plunger to press the backing ring into sealing engagement.

9. In a flexible pipe joint for joining a pair of pipe sections journalled for rotation and against axial movement with respect to each other and disposed with their bores in communication, the interstice between said pipe sections being enlarged to present an annular recess encircling said bores whereby any leakage between said pipe sections would pass through said recess and thence through the portion of said interstice beyond said recess, the portion of said interstice beyond said recess leading therefrom between wall sections of said recess which move with respect to each other, and packing means disposed within said recess and comprising an annulus of deformable material, and means restraining said deformable annulus from trusion into said portion of said interstice beyond said recess, said restraining means comprising a metal backing ring interposed between said deformable annulus and said relatively movable wall sections of said recess.

10. Packing for establishing fluid-tight seal between two tubular members journalled for rotary movement and against axial movement with respect to each other and having an annular recess between them encircling their intercommunicating bores, said recess having wall portions which converge outwards, and the outer portion of the interstice between said tubular member leading outwards from the angle between said wall portions, said packing being disposed within said recess and comprising an annulus of deformable material, and means having greater resistance to deformation than said deformable annulus for restraining said deformable annulus from trusion from said recess into said outer portion of said interstice by internal fluid pressure.

11. Packing for establishing fluid-tight seal between two tubular members journalled for rotary movement and against axial movement with respect to each other and having an annular recess between them encircling their intercommunicating bores, said recess having wall portions which converge outwards, and the outer portion of the interstice between said tubular member leading outwards from the angle between said wall portions, said packing being disposed within said recess and comprising an annulus of deformable material, and means restraining said deformable annulus from trusion from said recess into said outer portion of said interstice by internal fluid pressure, said restraining means comprising a metal backing ring interposed between said deformable annulus and said angle between said wall section.

FRANK M. ALLEN.
CLYDE B. TAYLOR.